May 11, 1954  R. B. ROBERTS ET AL  2,678,163
COMPUTING AND PREDICTING DEVICE
Filed Dec. 10, 1949  2 Sheets-Sheet 1
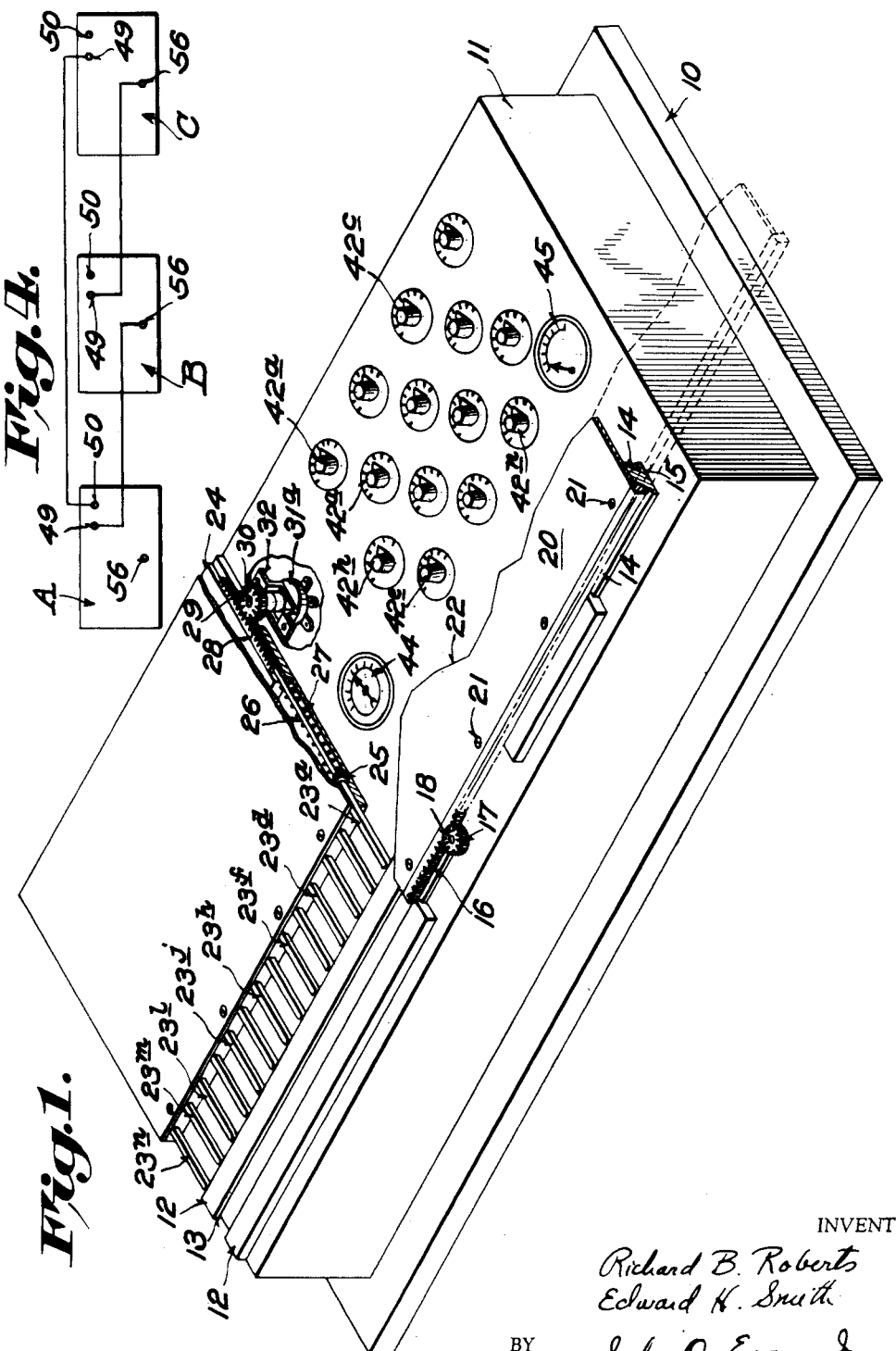
INVENTORS
Richard B. Roberts
Edward K. Smith
BY John O. Evans, Jr.
ATTORNEY

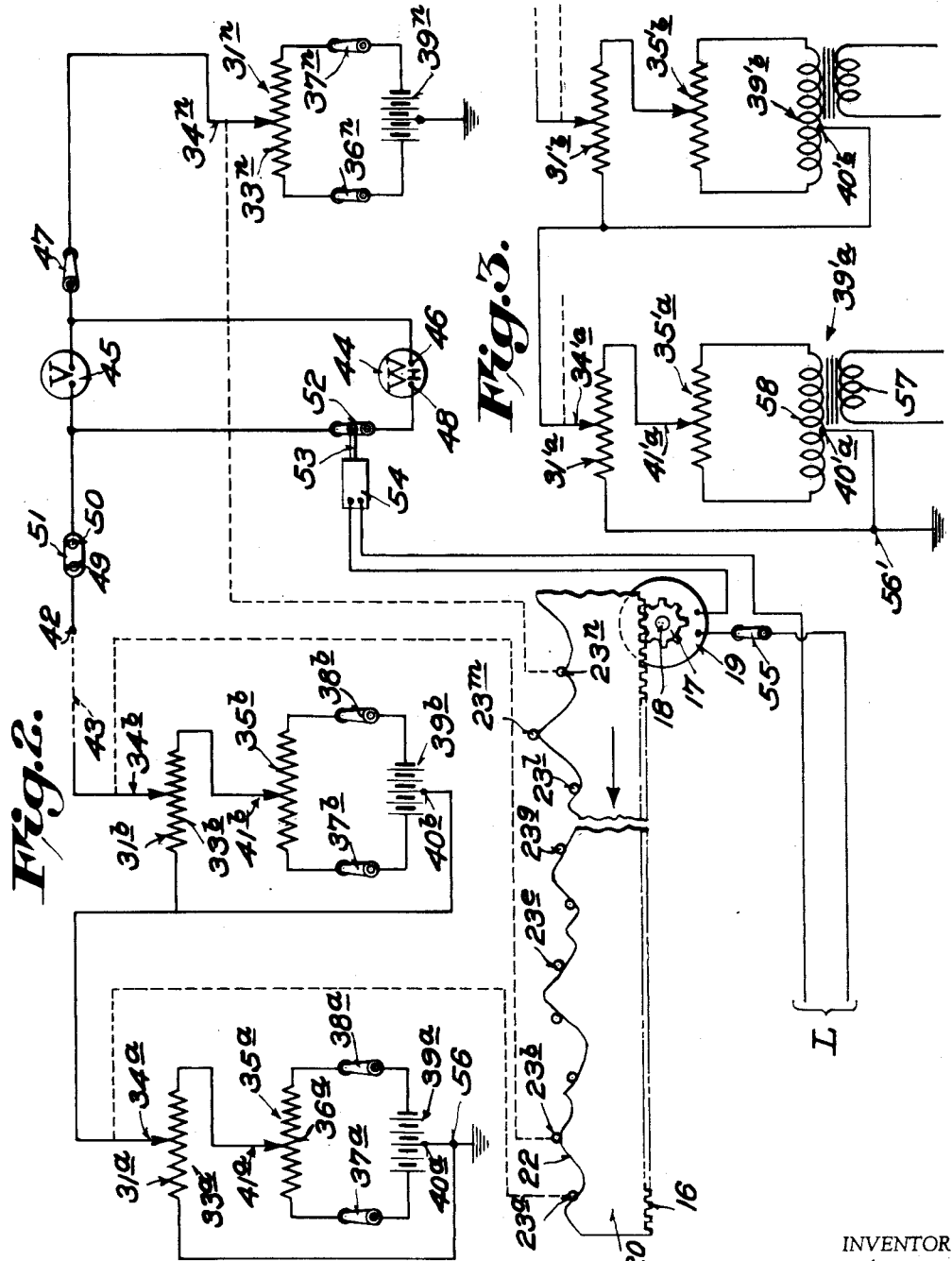

Patented May 11, 1954

2,678,163

UNITED STATES PATENT OFFICE 2,678,163

COMPUTING AND PREDICTING DEVICE

Richard B. Roberts, Washington, D. C., and Edward H. Smith, Silver Spring, Md., assignors of one-fourth to John O. Evans, Jr., Washington, D. C.

Application December 10, 1949, Serial No. 132,232

7 Claims. (Cl. 235—61)

This invention relates to a computing and predicting device especially adapted to extrapolating a curve or series. The device of the invention falls in the broad class of analogue computers, it being supplied with data in the form of a cam, film or the like wherein a mathematical variable is represented by a physical quantity having a continuous variation.

An object of the invention is to provide a device for extrapolating a curve or series beyond its known values.

Another object is to provide a device for rapidly finding a practicable prediction function based on previous values of the known function and correlated functions.

Another object of the invention is to provide a computing and predicting device that enables an operator to establish with speed and facility the standard deviation of an extrapolation or prediction function from the true value of the actual function.

Still another object is to provide a computing and predicting device that is composed of a relatively few simple and reliable components, easily assembled and inexpensive to build and maintain in operation.

The foregoing and other objects of the invention as may appear hereinafter are realized in a predicting and computing device including a plurality of pick-off elements responsive to physical quantities applied thereto, means for successively applying to the pick-off elements physical quantities representing a mathematical variable having a continuous variation, means for multiplying each of the responses of the pick-off devices by an individual adjustable quantity to provide a plurality of product responses, means for adding the product responses, an independent pick-off element responsive to said physical quantity applying means, and means for comparing the response of the independent pick-off element with the sum of the product responses.

In the drawings,

Fig. 1 is an isometric view of an exemplary form of computing and predicting device in accordance with the invention, parts being broken away to show interior construction;

Fig. 2 is a diagrammatic representation of the device of Fig. 1;

Fig. 3 is a partial diagrammatic view of another form of the invention; and,

Fig. 4 is a diagrammatic view of three devices such as shown in Fig. 1 operating in unison to give predictions based on three correlated functions.

Referring to the drawings, particularly to Fig. 1 thereof, the apparatus shown includes a base 10 of wood, plastic material or the like and a chassis 11 fabricated of sheet steel or the like mounted on the base. On the top of the chassis, near and parallel to the front edge thereof, is a cam guide or slide composed of spaced parallel rails 12 having projecting portions 13 received in slots 14 of a cam carrier 15, whereby the cam carrier may be translated in the guide from side to side of the chassis. For this purpose, the cam carrier 15, has a rack 16 mounted on its front edge, the rack being engaged by a pinion 17 rotated by a shaft 18 driven by an electric motor under the chassis shown at 19 in Fig. 2. A cam 20 is fastened to the cam carrier 15 by a plurality of screws 21. The cam has an edge 22 profiled in accordance with a chosen mathematical variable having a continuous variation; for example the cam edge may represent seasonal changes in temperature over a period of time, time being represented along an axis parallel to the direction of motion of the cam and temperature being represented at right angles thereto.

A plurality of pick-off devices are provided, each including spaced cam followers 23 mounted to bear against the cam edge 22 as the cam is moved from side to side as seen in Fig. 1. Each cam follower is mounted in a frame 24, for sliding movement at right angles to the direction of motion of the cam 20. Each follower has a collar 25 rigidly fixed thereto that strikes against the front wall of a recess 26 formed in the frame 24 to limit forward movement of the follower. A spring 27 is coiled about the shank of each follower within the recess 26 and is compressed between the collar 25 and the rear wall of the recess to bias the cam follower in a forward direction. The rear end of each follower is provided with a rack portion 28 engaging a pinion 29 driving a shaft 30 operating the slider of a potentiometer 31a mounted beneath the top of the chassis by a bracket 32 suitably affixed to the chassis.

It will then be seen that as the cam 20 is moved from right to left as seen in Fig. 1, the cam edge 22 will successively engage the forwardly projecting ends of the cam followers causing each follower to reciprocate in accordance with the undulations of the curved edge 22 and effecting corresponding movements of the sliders of the potentiometers associated with the followers.

Referring to Fig. 2 showing the computer of Fig. 1 in diagrammatic form, the cam is shown at 20, the driving motor at 19 and the driving pinion at 17. The cam followers are designated 23. The pick-off potentiometer 31a is actuated by the cam follower 23a, as explained in the foregoing description of Fig. 1, and the potentiometer has the usual resistance element 33a, and cooperating slider 34a. When the terminals of the resistance element 33a are supplied with a suitable voltage, as described hereinafter, the potentiometer together with the cam follower 23a drivingly connected to the slider 34a of the potentiometer constitute a pick-off device responsive to the cam 20, whereby an electric potential is available at the terminal of slider 34a providing a pick-off response that is a function of the physical quantity applied to the slider 23a by the cam.

The voltage applied to the terminals of the resistance element 33a is supplied from a second potentiometer 35a which may be called a multiplying potentiometer. The terminals of the resistance element 36a of this potentiometer are connected through manual switches 37a and 38a to the terminals of an electric battery 39a. The center terminal of the battery 40a is grounded. The potentiometer 35a has a slider 41a that is manually adjustable by means of a knob 42a, as shown in Fig. 1. Thus the voltage appearing between the slider 41a and the center terminal of the battery 40a is proportional in magnitude to the voltage of the battery multiplied by the displacement of the slider from the center position. The sine of the voltage depends on the direction of the displacement from the center.

In the circuit shown in Fig. 2 the voltage of the slider 34a with respect to ground is a function of the position of the manually adjusted slider 41a and of the position of the cam actuated slider 34a. This voltage will be approximately proportional to the products of the displacement of slider 34a from the grounded terminal multiplied by the displacement of the slider 41a from the center provided the resistance of the element 33a is high compared to the resistance of the element 36a when linear potentiometers are used.

A second pick-off and multiplier device is shown in Fig. 2 at the right of the corresponding device just described. The slider 34b of the pick-off potentiometer 31b is actuated by the cam follower 23b. The pickoff potentiometer 31b is energized by the battery 39b through the multiplying potentiometer 35b producing a product response voltage between the slider 34b and the center terminal of the battery 40b. It will be noted that the center terminal of the battery 39b is not grounded as in the case of battery 39a and that the battery return terminal of the resistor 33b of the second pick-off potentiometer is connected to the slider terminal of the first pick-off potentiometer 31a. This mode of connection places the product voltages of the slider terminals of the pick-off potentiometers 31a and 31b in series to ground and effects an algebraic addition of the product voltages to provide a voltage response at the slider terminal of potentiometer 31b that is the sum of the respective product voltages.

As shown in Fig. 1, fourteen cam followers 23 are shown. Thirteen of these, reading from right to left as seen in Fig. 1, are respectively connected to pick-off and multiplier devices of the kind described hereinbefore with reference to Fig. 2. The successive pick-off potentiometers are connected as are 31a and 31b to add the response voltages, and each battery except the first does not have its center terminal grounded. The product-sum response appears as a voltage at the terminal 42. The dotted line conductor section 43 represents the section including the third to the thirteenth pick-off and multiplier devices which are identical to the second pick-off and multiplier device and are not illustrated in the interest of eliminating unnecessary repetition.

The fourteenth cam follower 23n is included in an independent pick-off device having a pick-off potentiometer 31n including a slider 34n actuated by the follower. A battery 39n having its center terminal grounded is connected across the terminals of the potentiometer resistor 33n.

The response voltage of the independent pick-off device is compared with the sum of the product voltage responses appearing at the terminal 42 by means of a watt-hour meter 44 or a voltmeter 45. The output voltage of the terminal of slider 34n of the independent pick-off device is connected to one terminal 46 of the watt-hour meter through a manual switch 47. The voltage at terminal 42 is conducted to the other terminal 48 of the watt-hour meter through a pair of binding posts 49 and 50 bridged by a jumper 51 and through a switch 52. The voltmeter 45 is connected across the terminals of the watt-hour meter 44 which is connected to give a response proportioned to the square of the voltage of the voltmeter 45.

The switch 52 is operated by a link 53 driven by the core of a solenoid 54 connected in series with the cam driving motor 19. The motor and solenoid energizing circuit is arranged to close the switch when the motor is running and to open the switch when the motor is stopped. A manual switch 55 controls energization and de-energization of the motor 19 and solenoid 54.

For purposes of describing the operation of the computer and predictor of the invention, it will be assumed that the cam edge 22 represents a time-temperature curve, the time axis running parallel to the direction of movement of the cam and the temperature axis being disposed at right angles thereto. The cam followers 23 are spaced on centers representing time stations on the same scale as the time scale of the cam. As seen in Fig. 1, the distance from follower 23a to 23m represents one year and the distance between adjacent followers represents one month.

Let it be assumed that today is January 1, 1949, the point of time being represented by follower 23m. Follower 23a denotes January 1, 1948 and the intermediate followers represent the first days of the intermediate months. Cam follower 23n represents the future date, February 1, 1949.

The assumed present date, January 1, 1949, is marked at the left hand end of the cam, as seen in Fig. 1, and the average temperature for such date is represented by the height of the cam edge at that point. Going backwards in time from left to right, the average daily temperatures over a period of two, three, four, or even more years are plotted along the cam edge on a time scale that is the same as the time scale of the cam followers.

To adjust the apparatus, the cam is placed so that the point corresponding to the assumed present date falls under the follower 23n and the several followers from 23n to 23a assume positions in contact with the cam edge 22. With all switches closed and the potentiometers 35a to 35n initially set at random or arbitrary positions, the motor 19 is started to move the cam from right to left until the right hand end of the cam edge 22 arrives under follower 23a. After this run, an observation of the watt-hour meter is made and recorded. This reading indicates the probable error of the prediction and if the probable error is not suitably low, the potentiometers 35a to 35m are manually adjusted by means of the knobs 42a to 42m. Another run is then made and the watt-hour meter is again read and recorded. By a repetition of this trial and error process, the potentiometers are brought into adjustment to give a minimum watt-hour meter reading for a run.

During this process of adjustment, the reading of the voltmeter 45 continuously indicates the prediction error while the final reading of the watt-hour meter indicates the root mean square error averaged throughout the run.

When, after appropriate adjustment, minimum meter readings are achieved, the calculator is ready to make a prediction. For this purpose, the cam is set with the present date under cam follower 23m leaving cam follower 23n out of contact with the cam edge. Follower 23n is then manipulated until the reading of the voltmeter 45 is zero. The position of the free end of the follower with respect to the time axis represents the predicted temperature for the future date February 1, 1949.

The computing and predicting device described herein carries out the following computations:

(1) When the cam is stationary and in contact with followers 23a to 23m, the voltage V appearing at terminal 42.

$$V = \Sigma A_a y_{(x-a)} + A_b y_{(x-b)} + A_c y_{a(x-c)} \ldots A_m y_{(x-m)}$$

where $y$ is any function of $x$ and $y_{(x-a)}$ is the particular value of $y$ and when $x$ has the value $x-a$. $A_a$, $A_b$ ... etc. are arbitrary constants. The cam 20 is shaped to represent the function $y = f(x)$, the $x$ axis running parallel to the direction of movement of the cam and the $y$ axis being disposed at right angles thereto. $A_a$, $A_b$ ... $A_m$ are multiplying constants determined by the settings of potentiometers 35a to 35m. Each term in the sum, such as $A_b y_{(x-b)}$, corresponds to the voltage developed between the terminals 40 and 34 of the corresponding units. This voltage depends on the manual setting of a potentiometer 35 and the setting of a corresponding potentiometer 31 in accordance with the position of a cam follower 23.

(2) By moving the cam, $x$ takes on different values and the corresponding sums are calculated.

(3) By using appropriate pick-off devices the computer will give $$V = \Sigma A_a f_a(y_{x-a})$$

where $f_a$ represents certain non-linear functions of $y_{(x-a)}$. For example, the use of logarithmic potentiometers 31 will give $V = \Sigma A_a \log y_{(x-a)}$.

(4) When P is a prediction function of the form $$P_x = \Sigma_a A_a f_a(y_{x-a})$$

the device will compare the value of P with the actual value of $y$ giving the error $\epsilon = P_x - y_x$. The voltage V is equal to $P_x$, as explained above, while the voltage appearing at 34n is equal to the actual value of $y$ as sensed in accordance with the position of the cam follower 23n. Accordingly, the voltage difference across the voltmeter 45 is the difference $\epsilon$ between the predicted value $P_x$ and the actual value $y_x$.

(5) This error can be recorded for all values of $x$ by recording voltmeter. The error or its square can be integrated by a watt-hour meter. The watt hour meter 44 is constructed with high resistance coils. Both of these coils are connected to the terminals 46 and 48. Accordingly, the meter 44 responds to the time integral of the square of the applied voltage. As the voltage is applied to the meter only when the cam 20 is moving, the time integral corresponds to the integration of the error with respect to $x$.

(6) By use of additional units more complicated prediction functions based on correlated variables can be evaluated. In this case $$P_x = \Sigma A_a f_a y_{(x-a)} + \Sigma B_a g_a z_{(x-a)} + \Sigma \text{ etc.}$$

The first term is generated by unit A of Fig. 4, the second by unit B, etc. Addition of these terms is accomplished by the connections as shown in Fig. 4 and described in detail hereinafter.

(7) The prediction function can be adjusted rapidly to minimize errors by manual adjustment of the knobs 42.

(8) Predicted values beyond the range of known quantities can be determined by setting the cam at its limit as described hereinbefore.

As indicated diagrammatically in Fig. 4, a number of calculators such as described may be connected together to operate on correlated functions. The jumpers 51 are removed from the binding posts 49 and 50 of the three computers A, B, and C. In the predictors B and C, the ground connections at terminals 56 are removed. Terminal 49 of predictor A is connected to terminal 56 of predictor B and terminal 49 of predictor B is connected to terminal 56 of predictor C. Terminal 49 of predictor C is connected to terminal 50 of predictor A. In effect, this places the serially connected multiplying devices of the three predictors in series to ground and in opposition to the independent pick-off device of predictor A only. Cams representing three correlated functions on equivalent longitudinal axes are simultaneously run through the three predictors A, B and C. The potentiometers 35 of all of the predictors are adjusted to give minimum readings on the instruments of predictor A and a prediction is then made as described hereinbefore.

Referring to Fig. 3, the partial diagram illustrates the manner in which transformers may be used instead of batteries. In this figure, parts designated by primed reference numerals correspond to similar parts designated by the same unprimed numerals in Figs. 1 and 2. The pick-off potentiometers, the sliders of which are operated by the cam followers, are shown at 31' and the manually adjustable potentiometers are shown at 35'. The reference numerals 39' designate transformers having primary windings 57 supplied with alternating current and secondary windings 58 that are tapped at the center 40'. The connections from the secondary windings of the transformers are the same as from the terminals of the batteries 39 of Fig. 2.

From the foregoing description it will be seen that the present invention provides a calculating and predicting device that is relatively simple to make and operate and that gives predicted values of continuous functions with ease and rapidity.

Various modifications of the invention will occur to those skilled in the art without departing from the spirit of the invention. Alternative combinations of cam and pick-off devices are apparent, such as a photographic film "cam"

and photoelectric cell pick-offs. Mechanical pick-off devices and mechanical multiplying and adding mechanisms are within the purview of the invention; as are other equivalent elements and combinations thereof. The spacing of the pick-off devices need not be uniform and any or all of the cam followers may be adjustably positionable along the line of travel of the cam. It is especially desirable to be able to move the position of the independent pick-off cam follower so that predictions at different dates may be obtained.

The physical quantities representing the mathematical variable to be applied to the pick-off devices may be in the form of magnetic recordings on a movable wire or tape and the pick-off devices in such case include conventional reproducing heads responsive to the variable magnetic field created when the tape is moved past the heads.

We claim:

1. A computer and predictor comprising a plurality of pick-off potentiometers, means for varying the slider positions of said potentiometers in accordance with a succession of physical quantities representing a mathematical variable having a continuous variation, means for applying to the resistance elements of each of said potentiometers an electric potential of selected and adjustable value, circuit elements connecting the slider output potentials of said potentiometers in series, an independent pick-off potentiometer, means for varying the slider position of said independent potentiometer in accordance with said succession of physical quantities, means for applying to the resistance element of said independent pick-off potentiometer an electric potential of selected and adjustable value, a voltage responsive electric instrument, and circuit elements connecting the slider output potential of said independent pick-off potentiometer and the output potential of the series connected slider output potentials of said pick-off potentiometers to said instrument.

2. A computer and predictor as defined in claim 1 wherein said electric potential applying means comprise electric batteries.

3. A computer and predictor as defined in claim 1 wherein said electric potential applying means comprise transformers.

4. A computer and predictor as defined in claim 1 wherein said means for successively applying physical quantities to said pick-off potentiometers comprises a cam.

5. A computer and predictor as defined in claim 1 wherein said electric instrument is a recording voltmeter.

6. A computer and predictor as defined in claim 1 wherein said electric instrument is a watt-hour meter.

7. A computer or predictor comprising a cam having a cam surface representing a mathematical variable having a continuous variation, a plurality of pick-off devices riding on said cam surface, means for moving said cam with respect to said pick-off devices, means responsive to the excursion of said pick-off devices, means for multiplying each of said responses by an individual adjustable quantity to provide a plurality of product responses, means for adding said product responses, an independent pick-off device riding on said cam surface, and means for measuring the difference between the responses of said independent pick-off device with the sum of said product responses.

References Cited in the file of this patent

UNITED STATES PATENTS

| Number | Name | Date |
|---|---|---|
| 1,936,986 | Swartwout | Jan. 8, 1935 |
| 2,258,859 | Mitelman | Oct. 14, 1941 |
| 2,439,381 | Darlington et al. | Apr. 13, 1948 |
| 2,442,383 | Stewart et al. | June 1, 1948 |
| 2,477,395 | Sunstein | July 26, 1949 |
| 2,484,737 | Razek | Oct. 11, 1949 |
| 2,494,076 | Williams | Jan. 10, 1950 |

FOREIGN PATENTS

| Number | Country | Date |
|---|---|---|
| 553,947 | Great Britain | July 5, 1940 |